United States Patent
Cho

(10) Patent No.: US 9,484,147 B2
(45) Date of Patent: Nov. 1, 2016

(54) WIRED-WIRELESS COMBINED POWER TRANSMISSION APPARATUS AND THE METHOD USING THE SAME

(71) Applicant: LG INNOTEK CO., LTD., Seoul (KR)

(72) Inventor: Shin Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 707 days.

(21) Appl. No.: 13/840,218

(22) Filed: Mar. 15, 2013

(65) Prior Publication Data

US 2014/0097697 A1   Apr. 10, 2014

(30) Foreign Application Priority Data

Oct. 4, 2012 (KR) .................. 10-2012-0109787

(51) Int. Cl.
*H01F 38/14* (2006.01)
*H02J 5/00* (2016.01)
*G06F 1/26* (2006.01)
*H02J 7/02* (2016.01)
*H02J 7/00* (2006.01)

(52) U.S. Cl.
CPC ............ *H01F 38/14* (2013.01); *G06F 1/26* (2013.01); *G06F 1/263* (2013.01); *H02J 5/005* (2013.01); *H02J 7/025* (2013.01); *H02J 2007/0062* (2013.01)

(58) Field of Classification Search
CPC ........................................ H01F 38/14
USPC ........................................ 307/104
See application file for complete search history.

(56) References Cited

U.S. PATENT DOCUMENTS

| 2010/0084918 | A1 | 4/2010 | Fells et al. | |
|---|---|---|---|---|
| 2010/0219697 | A1* | 9/2010 | Azancot | H01F 38/14 307/104 |
| 2011/0018360 | A1* | 1/2011 | Baarman | H02J 5/005 307/104 |
| 2011/0260532 | A1 | 10/2011 | Tanabe | |
| 2012/0176085 | A1* | 7/2012 | Iida | H02J 7/025 320/108 |
| 2013/0026981 | A1* | 1/2013 | Van Der Lee | H02J 5/005 320/108 |

FOREIGN PATENT DOCUMENTS

| JP | 63-217931 A | 9/1988 |
|---|---|---|
| JP | 7-104009 A | 4/1995 |
| JP | 2003-153456 A | 5/2003 |
| JP | 2004-23982 A | 1/2004 |
| JP | 2010-288442 A | 12/2010 |

(Continued)

*Primary Examiner* — Rexford Barnie
*Assistant Examiner* — Joseph Inge
(74) *Attorney, Agent, or Firm* — Birch, Stewart, Kolasch & Birch, LLP

(57) ABSTRACT

Disclosed are a wired-wireless combined power transmission apparatus and a method using the same. The wired-wireless combined power transmission apparatus includes a rectifying unit converting an AC input signal into a DC signal, a transformer unit transforming a size of the input signal, which has been converted into the DC signal, into a predetermined size, a wireless power transmission unit receiving the signal transformed by the transformer unit to wirelessly transmit power, and a wired power supply unit receiving the signal transformed by the transformer unit to supply power through a cable. The advantages and disadvantages of the wired power transmission apparatus and the wireless power transmission apparatus are supplemented to each other, so that the power conversion efficiency and the versatility are improved.

17 Claims, 9 Drawing Sheets

(56) References Cited

FOREIGN PATENT DOCUMENTS

| | | |
|---|---|---|
| JP | 2012-75283 A | 4/2012 |
| JP | 2013-110915 A | 6/2013 |
| JP | 2013-240206 A | 11/2013 |
| KR | 20-0415537 Y1 | 5/2006 |
| KR | 10-2011-0065552 A | 6/2011 |
| WO | WO 2011/011681 A2 | 1/2011 |

* cited by examiner

WIRED-WIRELESS COMBINED POWER TRANSMISSION APPARATUS AND THE METHOD USING THE SAME

TECHNICAL FIELD

The embodiment relates to a wired-wireless combined power transmission apparatus and a method using the same.

BACKGROUND ART

In general, a portable electronic device such as a cellular phone, a laptop computer, or a PDA is provided therein with a storage battery so that a user can use the portable electronic device while moving.

However, the portable electronic device is equipped with an additional charger to charge power into the storage battery. The charger is connected to a typical power supply to charge power into the storage battery by supplying charge current to the storage battery of the portable electronic device. Meanwhile, in order to allow the charger to supply the charge current to the storage battery of the portable electronic device, a charger body constituting the charger must be electrically connected to the storage battery of the portable electronic device. In the case of a wired charger (contact-type charger), in order to electrically connect the charger body to the storage battery of the portable electronic device, the charger body and the portable electronic device or the storage battery individually include connectors. Accordingly, the connector of the portable electronic device or the storage battery must be connected to the connector of the charger body to charge power into the storage battery of the portable electronic device.

However, in the contact-type charger having the charger body connected to the storage body or the portable electronic device through the connector, the connector protrudes to the outside, so that an outer appearance is not only deteriorated, but the connector is contaminated with external foreign matters so that connection failure occurs. In addition, the connector is occasionally shorted due to careless use of the user, so that the storage battery may be fully discharged.

In order to solve the problem, a scheme of charging the energy of the charger body into the storage body by electrically connecting the charger body to the storage battery of the portable electronic device through a wireless (non-contact) scheme has been developed.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, wireless energy transmission schemes include a remote telecommunication technology based on resonance or a short wave radio frequency in addition to electromagnetic induction.

In the case of a short-distance wireless power transmission, which has been spotlighted in these days, a wireless power transmitter is installed in a building in such a manner that a mobile device, such as a cellular phone or a notebook computer, can be continuously charged with power when a user uses the mobile device in the building even if the mobile device is not connected to an additional power cable.

However, the wireless power transmission technology has disadvantages in that the long charging time is required, and the power transmission distance between devices subject to the charging operation is short when the induced electromotive force is used, so that the distance allowing the use of the devices during the wireless charging operation is reduced.

DISCLOSURE

Technical Problem

The embodiment provides a power supply apparatus serving as a wired-wireless combined power transmission apparatus in which both of wired power transmission and wireless power transmission can be performed through one apparatus.

The embodiment provides a power supply method using the wired-wireless combined power transmission apparatus.

Technical Solution

According to the embodiment, there is provided a wired-wireless combined power transmission apparatus, which includes a rectifying unit converting an AC input signal into a DC signal, a transformer unit transforming a size of the input signal, which has been converted into the DC signal, into a predetermined size, a wireless power transmission unit receiving the signal transformed by the transformer unit to wirelessly transmit power, and a wired power supply unit receiving the signal transformed by the transformer unit to supply power through a cable, and a method using the same.

Advantageous Effects

As described above, according to the embodiment, the charging time can be reduced, and the mobile device can be conveniently used during the charging operation by overcoming the disadvantages of the wireless power transmission. In addition, the power can be transmitted without the disconnection from the mobile device by overcoming the problem of the wired power transmission.

Further, the wired power transmission and the wireless power transmission can be simultaneously achieved with respect to a plurality of devices.

Since an insulated off-line DC power supply is embedded in the wired-wireless combined power transmission apparatus, the structure of the product can be simplified, and a user can easily carry the wired-wireless combined power transmission apparatus. In addition, at least two power sources can be easily configured in the DC power supply by using multiple windings. Further, since an additional DC-DC converter for multiple outputs is not used, the cost can be reduced, and the power conversion efficiency can be increased.

In addition, since the wired power supply based on the USB port is possible, the versatility can be improved. Further, since only the AC power cable may be replaced in order to satisfy various power standards suitable for various nations, the development cost and the replacement cost can be reduced.

BEST MODE

Mode for Invention

Figure 1:
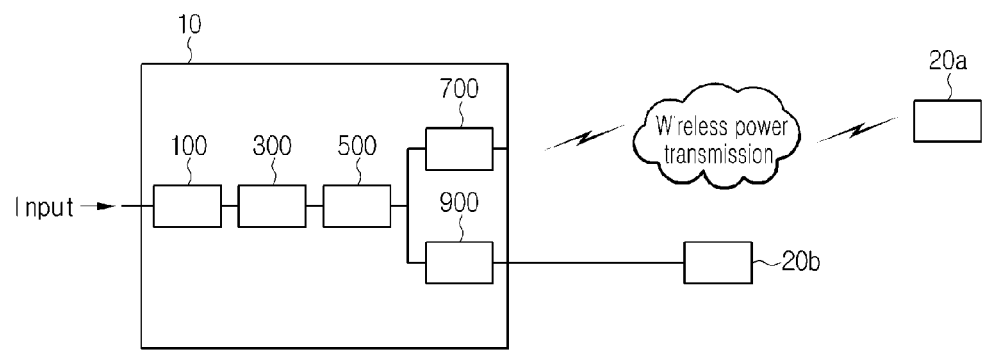
FIG. 1 is a block diagram showing a wired-wireless combined power transmission apparatus according to one embodiment.

Hereinafter, embodiments will be described in detail with reference to accompanying drawings so that those skilled in the art can easily work with the embodiments. However, the disclosure can be implemented in various forms, and not limited to the embodiments. For the purpose of convenience of explanation, the details of parts irrelevant to the description of the disclosure will be omitted. The same reference numbers will be assigned the similar elements throughout the drawings.

In the following description, when a first part is connected to a second part, the first and second parts are not only directly connected to each other, but also electrically connected to each other while interposing a third part therebetween.

In the following description, when a predetermined part "includes" a predetermined component, the predetermined part does not exclude other components, but may further include other components if there is a specific opposite description. In addition, the term "~part", "~device", or "~module" refer to a unit to process at least one function or at least operation, and can be implemented in hardware, software, or the combination of the hardware and the software.

The thicknesses of several layers and regions shown in the drawings may be enlarged for the purpose of convenience or clarity. The same reference numbers will be assigned the similar elements throughout the drawings. In the description of the embodiments, it will be understood that, when a layer, a film, a region or a plate is referred to as being "on" or "under" another layer, another film, another region, or another plate, it can be "directly" or "indirectly" on the other layer, film, region, plate, or one or more intervening layers may also be present. Such a position of the layer has been described with reference to the drawings.

FIG. 1 is a block diagram showing a wired-wireless combined power transmission apparatus 10 according to one embodiment.

Referring to FIG. 1, the wired-wireless combined power transmission apparatus 10 according to the embodiment includes a filter unit 100, a rectifying unit 300, a transformer unit 500, a wireless power transmission unit 700, and a wired power supply unit 900.

The filter unit 100 removes electromagnetic interference (EMI) noise, which is introduced together with an input AC signal, from the input AC signal and outputs the input AC signal to the rectifying unit 300. The rectifying unit 300 converts the AC signal, which has been received therein from the filter unit 100, into a DC signal.

The transformer unit 500 transforms the converted DC signal, which has been received therein from the rectifying unit 300, in terms of the level of the DC signal, and outputs the transformed DC signal to the wireless power transmission unit 700 and the wired power supply unit 900.

The wireless power transmission unit 700 receives the transformed signal from the transformer unit 500 and wirelessly transmits the transformed signal to a wireless power receiver 20a.

The wired power supply unit 900 receives the transformed signal from the transformer unit 500 and performs wired-power-transmission of the transformed signal to a wired power receiver 20b connected thereto through a cable.

The wired-wireless combined power transmission apparatus 10 may transmit power to the wireless power receiver 20a and/or the wired power receiver 20b.

Hereinafter, the wired-wireless combined power transmission apparatus 10 of FIG. 1 will be described in detail with reference to FIGS. 2 to 6.

Figure 2:
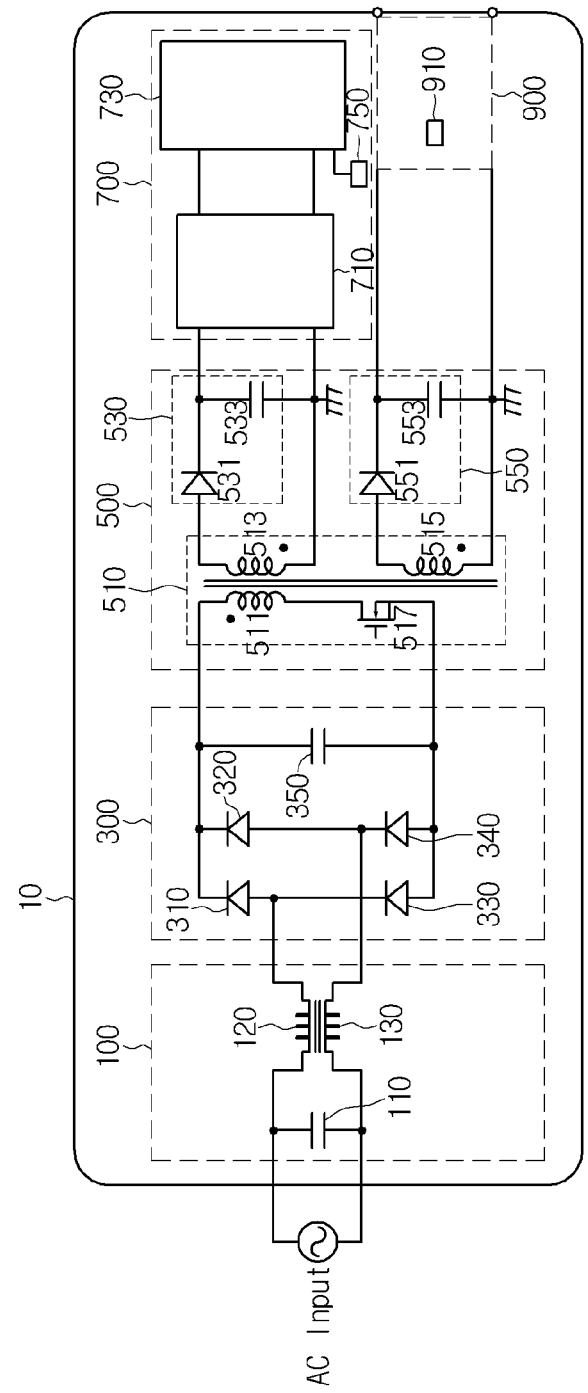
FIG. 2 is a circuit diagrams showing the wired-wireless combined power transmission apparatus of FIG. 1.
Figure 3:
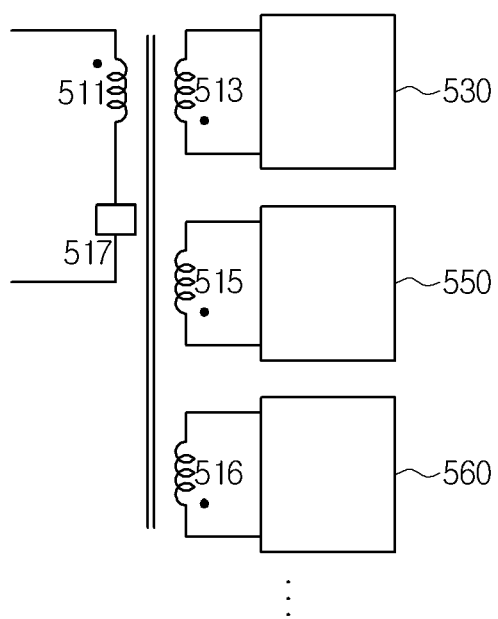
FIG. 3 is a circuit diagram showing one example of a transformer.
Figure 4A:
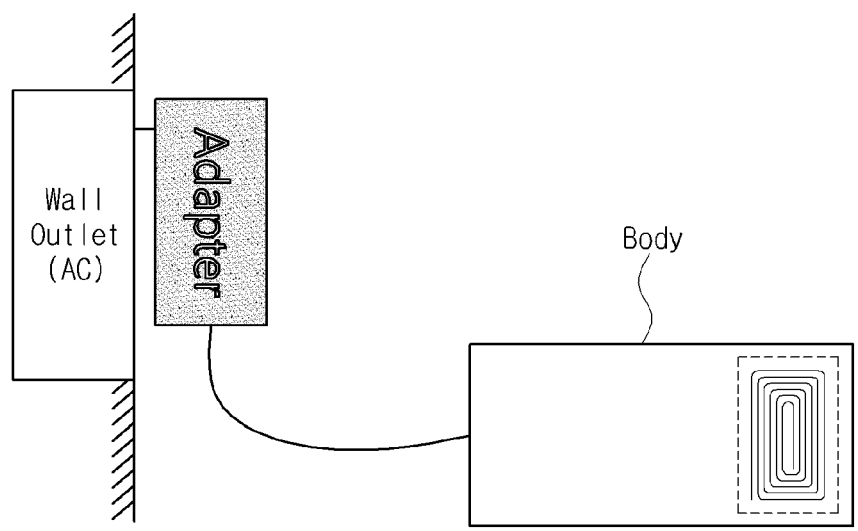
FIG. 4A is a view showing the arrangement of a coil in a wireless power transmission unit having one coil.
Figure 4B:
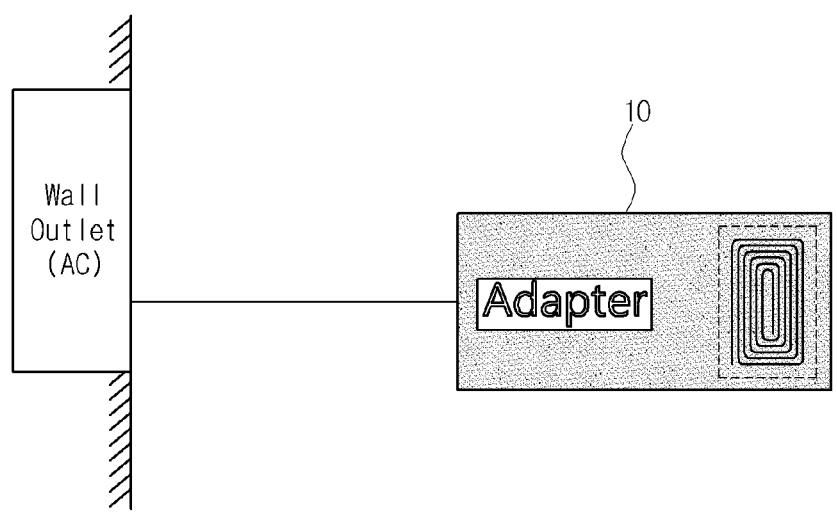
FIG. 4B is a view showing the arrangement of coils in the wireless power transmission unit having a plurality of transmission coils.
Figure 5A:
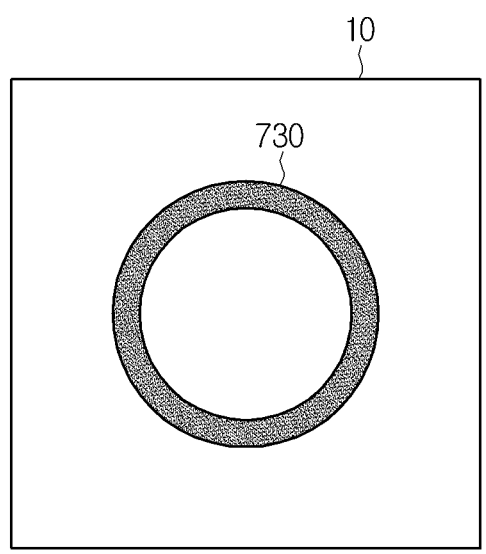
FIG. 5A is a schematic view showing the configuration of an adaptor and a body of a wireless power transmission apparatus according to the related art.
Figure 5B:
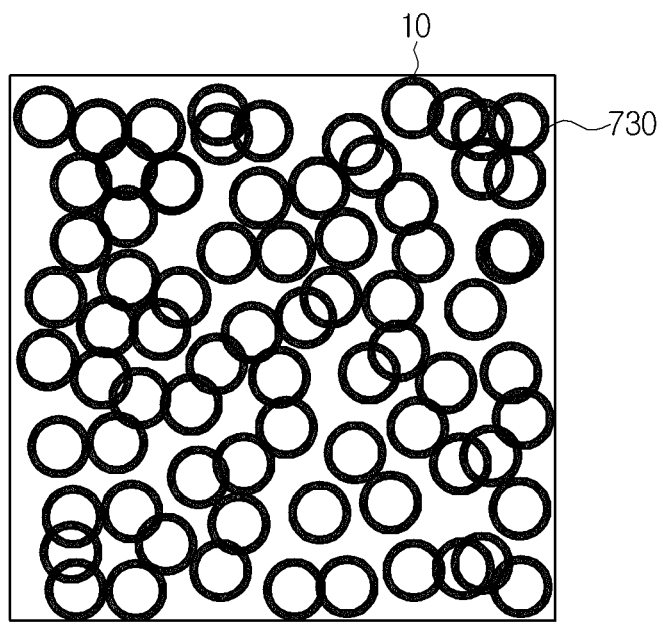
FIG. 5B is a schematic view showing a wired-wireless combined power transmission apparatus including an adaptor according to the embodiment.
Figure 6:
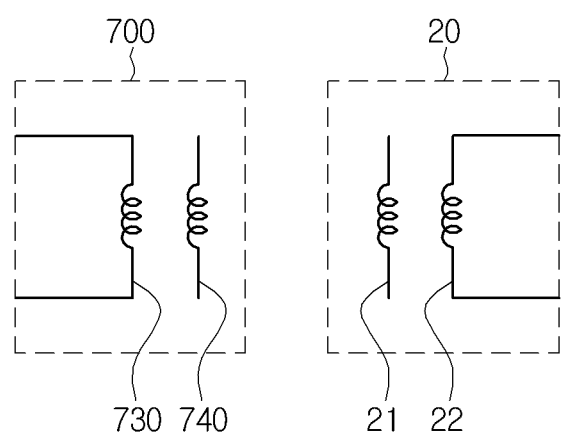
FIG. 6 is a view showing a wireless power transmission unit and a wireless power system including resonance coils.

FIG. 2 is a circuit diagrams showing the wired-wireless combined power transmission apparatus of FIG. 1, FIG. 3 is a circuit diagram showing one example of a transformer, FIG. 4A is a view showing the arrangement of a coil in a wireless power transmission unit having one coil, and FIG. 4B is a view showing the arrangement of coils in the wireless power transmission unit having a plurality of transmission coils. FIG. 5A is a schematic view showing the configuration of an adaptor and a body of a wireless power transmission apparatus according to the related art, FIG. 5B is a schematic view showing a wired-wireless combined power transmission apparatus including an adaptor according to the embodiment, and FIG. 6 is a view showing a wireless power transmission unit and a wireless power system including resonance coils.

The filter unit 100 includes a capacitor 110 and inductors 120 and 130. According to one embodiment, the filter unit 100 includes the capacitor 110 to which the input signal is applied, the inductor 120 connected to one terminal of the capacitor 110 and the inductor 130 connected to an opposite terminal of the capacitor 110. The inductors 120 and 130 are electrically connected to each other. The opposite terminals of the inductors 120 and 130 constituting the output stage of the filter unit 100 may be connected to the rectifying unit 300. However, the filter unit 100 is not limited to the above structure, but may have various structures sufficient to filter the EMI noise.

The AC signal input through both terminals of the capacitor 110 of the filter unit 100 may contain the EMI noise, which causes the malfunction of electronic devices. Accordingly, it is necessary to remove the EMI noise. Therefore, the filter unit 100 removes electromagnetic interference (EMI) noise, which is introduced together with the input AC signal, from the input AC signal and outputs the input AC signal without the EMI noise to the rectifying unit 300.

The rectifying unit 300, which converts an AC input signal into a DC signal, includes a bridge rectifier and a capacitor.

The bridge rectifier includes four diodes bridged to each other. The AC input signal passing through the bridge rectifier is converted into an AC signal inverted in the same direction. The inverted AC signal is charged in the capacitor, so that the DC voltage having a predetermined size may be output in the transformer unit.

In detail, the bridge rectifier includes first to fourth diodes 310 to 340.

The transformer unit 500 includes a transformer 510 and output filters 530 and 550.

The transformer 510 includes a primary inductor 511, secondary inductors 513 and 515, and a switching device 517. The secondary inductors 513 and 515 include a first secondary inductor 513 and a second secondary inductor 515. In addition, the secondary inductors may include at least two inductors.

The switching device 517 may be configured to have the combination of the series-parallel connected switching devices. Preferably, the switching device 517 may include a transistor.

The output filters 530 and 550 include the first output filter 530 and the second output filter 550. The number of the output filters 530 and 550 is not limited thereto, but a plurality of output filter may be employed depending on the number of the secondary inductors 513 and 515. The output filters 530 and 550 include rectifying devices 531 and 551 and capacitors 533 and 553. Preferably, the rectifying devices 531 and 551 may include diodes.

For example, the transformer unit 500 may include a flyback DC-DC converter. Hereinafter, the connection relation of the transformer unit 500 according to the embodiment will be described. One terminal of the primary inductor 511 of the transformer unit 510 may be connected to one terminal of the rectifying unit 300, and an opposite terminal of the primary inductor 511 may be connected to one terminal of the switching device 517. An opposite terminal of the switching device 517 may be connected to an opposite terminal of the rectifying unit 300. One terminal of the first secondary inductor 513 is connected to a diode 531 of the first output filter 531 in a forward direction, and an opposite terminal of the first secondary inductor 513 may be connected to one terminal of the capacitor 533 of the first output filter 531. One terminal of the second secondary inductor 515 may be connected to a diode 515 of the second output filter 515 in the forward direction, and an opposite terminal of the second secondary inductor 515 may be connected to one terminal of a capacitor 553 of the second output filter 515. Both terminals of the capacitor 533 of the first output filter may be connected to an inverter 710 of the wireless power transmission unit 700, and both terminals of the capacitor 553 of the second output filter may be connected to both terminals of the wired power supply unit 900. The primary inductor 511 may be electrically connected to the secondary inductors 513 and 515.

The switching device 517 of the transformer unit is turned on or turned off according to the control signal to apply the output DC signal converted by the rectifying unit 300 to the primary inductor 511. The primary inductor 511 is electrically connected to the secondary inductors 513 and 517. The signal applied to the primary inductor 511 of the transformer unit 500 is transformed into a signal having a predetermined size varying according to the turn ratio between the primary inductor 511 and the secondary inductors 513 and 515, so that the transformed signal may be output through the secondary inductors 513 and 515.

In other words, the transformer 510 of the transformer unit 500 transforms the signal, which is applied thereto through the turn-on or turn-off of the switching device 517, into a signal having a predetermined size varying according to the turn ratio between the primary inductor 511 and the secondary inductors 513 and 515 so that the transformed signal may be output to the first output filter 530 and the second output filter 550 of the transformer 500. The first output filter 530 may filter the signal received therein from the transformer 510 through the diode 531 and the capacitor 533 and output the signal to the wireless power transmission unit 700. The second output filter 550 may filter the signal received therein from the transformer 510 through the diode 551 and the capacitor 553 and output the signal to the wired power supply unit 900.

Meanwhile, as shown in FIG. 3, the transformer unit 500 may further include secondary inductors 513, 515, and 516 in order to generate a plurality of output signals. As shown in FIG. 3, the transformer 510 further includes the third secondary inductor 516. The transformer 510 may output signals, which are transformed by a predetermined magnitude, through the secondary inductors 513, 515, and 516.

In addition, the transformer unit 500 includes a third output filter 560 in order to filter the output of the third secondary inductor 516. The third output filter 560 may receive and filter the output signal of the third secondary inductor 516 to transmit the output signal to the wireless power transmission unit 700 or the wired power supply unit 900.

The number of the secondary inductors and the output filters, which are additionally formed in the transformer unit 500, is not limited to the number of the secondary inductors and the output filters employed in the embodiment. A plurality of transformed signals varying depending on the number of the secondary inductors and the output filters, which are additionally formed, may be output.

As shown in FIG. 2, the wireless power transmission unit 700 includes an inverter 710, a transmission coil 730, and a wireless transceiver controller 750.

The inverter 710 may convert an output DC signal, which is received therein from the first output filter 530, into an AC signal to be transmitted to the transmission coil 730. The transmission coil 730 can wirelessly transmit power by receiving the AC signal from the inverter 710. If AC current flows through the transmission coil 730, AC current is applied even to a coil of the wireless power receiver, which is physically spaced apart from the transmission coil 730, through the electromagnetic induction, so that the power can be wireless transmitted. The wireless transceiver controller 750 may control the operation of each part of the wireless power transmission unit 700. The wireless transceiver controller 750 may determine the state of the wireless power transmission when the wireless power receiver is located within the coverage area of the wireless power transmission by detecting a signal from the wireless power receiver and may control the wireless power transmission.

A plurality of transmission coils 730 may be provided. If a plurality of transmission coils 730 are provided, power may be simultaneously supplied to a plurality of power receivers in wireless. In addition, regarding the structure of a transmission unit and a receiving unit, the structure of a pair of a wireless transmission unit and a wireless reception unit, the structure of multiple wireless transmission units and one wireless reception unit, the structure of one wireless transmission unit and multiple wireless reception units, and the structure of multiple wireless transmission units and multiple wireless reception units may be provided.

In addition, the free positioning of the wireless power receiver is possible. FIG. 4A shows the case that one transmission coil 730 is provided. In this case, only if the wireless power receiver is placed at a specific position, the wireless power transmission is possible. Meanwhile, FIG. 4B shows the case that a plurality of transmission coils 730 are provided. In this case, according to the free positioning scheme, if the wireless power receiver is placed at a specific range on the surface of the wired-wireless combined power transmission apparatus 10, a sensor detects the position of the wireless power receiver so that the power transmission is possible.

The wired-wireless combined power transmission apparatus 10 according to the present invention does not use additional adaptors for wireless power transmission unlike the structure shown in FIG. 5A. In other words, since the wired-wireless combined power transmission apparatus 10 uses the rectifier and the DC-DC converter constituting the wired power transmission apparatus, the wired-wireless combined power transmission apparatus 10 does not require additional adaptors for the wireless power transmission unit. Accordingly, according to the embodiment, as shown in FIG. 5B, an adaptor 200 may be physically included in the wired-wireless combined power transmission apparatus 10. Since the structure is provided in the wired power transmission apparatus, the production can be easily achieved, the price competitiveness can be enhanced, the structure can be simplified, and a user can easily carry the structure.

Meanwhile, the wireless power transmission unit 700 of the wired-wireless combined power transmission apparatus 10 according to the embodiment may further include a transmission resonance coil 740 as shown in FIG. 6. If the wireless power transmission unit 700 includes transmission resonance coils, and if AC current is applied to the transmission resonance coil 730, the AC current may be induced into a transmission resonance coil 740 spaced apart from the transmission resonance coil 730 through the electromagnetic induction, and power received from the transmission resonance coil may be wirelessly transmitted to a resonance coil 21 of a wireless power receiver 20, which is spaced apart from the transmission resonance coil 740 and constitutes a resonance circuit, through the magnetic resonance. The power transmission through the magnetic resonance is to transmit power between two LC circuits subject to the impedance matching. The power transmitted through the magnetic resonance can be farther transmitted with higher efficiency when comparing with the power transmitted through the electromagnetic induction.

Referring to FIG. 2 again, the wired power supply unit 900 may supply power to the receiver through a cable after receiving the output of the second output filter. The wired power supply unit 900 may include a connector 910, and the connector 910 may have various connection structures allowing the connection of various cables capable of connecting the wired-wireless combined power transmission apparatus 10 to the wired power receiver.

For example, the connector 910 may use a USB port as the connection structure. In addition, a plurality of connectors 910 may be provided. If a plurality of connectors 910 are provided, power can be transmitted to a plurality of wired power receivers.

Figure 7:
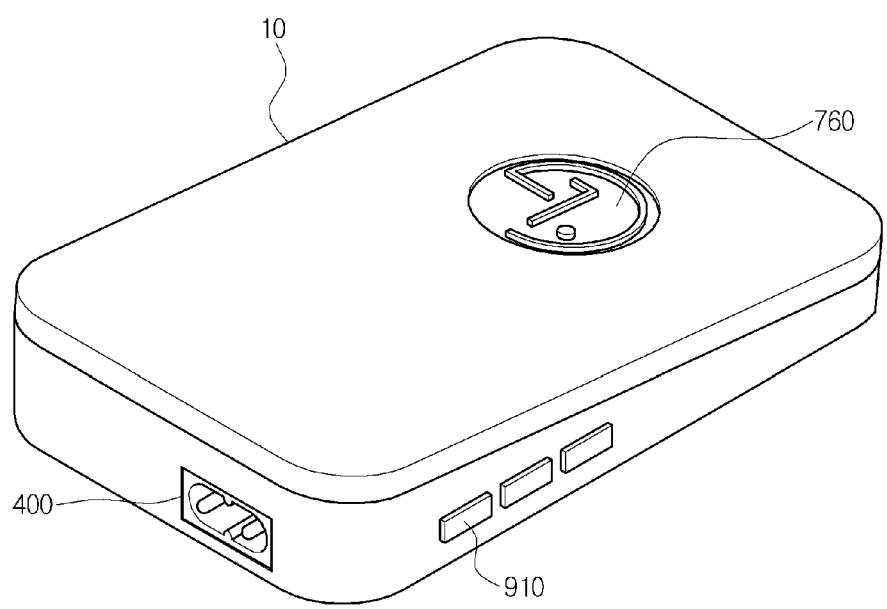
FIG. 7 is a view showing an outer appearance of the wired-wireless combined power transmission apparatus according to the embodiment.

FIG. 7 is a perspective view showing a wired-wireless combined power transmission apparatus 10 according to the embodiment.

The wired-wireless combined power transmission apparatus 10 is provided at an outer portion thereof with a power input unit 400, a charging region 760, and the connector 910. The power input unit 400 may receive power from a power source and supply the power to the wired-wireless combined power transmission apparatus 10. The charging region 760 is a specific region provided on the top surface of the wired-wireless combined power transmission apparatus 10 in which the power can be transmitted from the wireless power transmitter to the wireless power receiver through the electromagnetic induction. The connector 910 may be connected to various cables which may connect the wired-wireless combined power transmission apparatus 10 to the wired power receiver. Power can be transmitted to a plurality of wired power receivers through a plurality of connectors 910.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. A wired-wireless combined power transmission apparatus comprising:
   a rectifying unit converting an AC input signal into a DC signal;
   a transformer unit transforming a size of the DC signal;
   a wireless power transmission unit, to wirelessly transmit power, to a wireless power receiver; and
   a wired power supply unit, to supply power through a cable, to a wired power receiver,
   wherein the transformer unit includes:
   a transformer transforming the size of the DC signal, which has been converted into a predetermined size,
   a switching device controlling an operation of the transformer,
   an output filter filtering an output of the transformer,
   a primary inductor receiving the DC signal, and
   a secondary inductor electrically connected to the primary inductor, wherein the secondary inductor includes a first secondary inductor and a second secondary inductor, and
   wherein the output filter includes:
   a first output filter filtering a first transformed DC signal received from the first secondary inductor and outputting a first filtered output signal to the wireless power transmission unit, and
   a second output filter filtering a second transformed DC signal received from the second secondary inductor and outputting a second filtered output signal to the wired power supply unit.

2. The wired-wireless combined power transmission apparatus of claim 1, wherein the wireless power transmission unit includes:
   an inverter receiving the first filtered output signal from the transformer unit to convert the first filtered output signal into a second AC signal; and
   a transmission coil transmitting the second AC signal, which has been received from the inverter, to the wireless power receiver through electromagnetic induction.

3. The wired-wireless combined power transmission apparatus of claim 2, wherein the wireless power transmission unit further includes a plurality of transmission coils, and the power is simultaneously supplied to a plurality of wireless power receivers through the transmission coils in wireless.

4. The wired-wireless combined power transmission apparatus of claim 2, wherein the wireless power transmission unit further includes:

a plurality of transmission coils; and
a sensor detecting a position of a wireless power receiver if the wireless power receiver is located within a specific range of a top surface of the transmission coils.

5. The wired-wireless combined power transmission apparatus of claim 2, further comprising a wireless transceiver controller controlling wireless power transmission by detecting a signal from a wireless power receiver.

6. The wired-wireless combined power transmission apparatus of claim 2, further comprising a transmission resonance coil electrically connected to the transmission coil.

7. The wired-wireless combined power transmission apparatus of claim 1, wherein the wired power supply unit includes a connector connected to a cable for connection with the wired power receiver.

8. The wired-wireless combined power transmission apparatus of claim 7, wherein the connector includes a USB port.

9. The wired-wireless combined power transmission apparatus of claim 1, wherein the transformer further includes at least two of the secondary inductors.

10. The wired-wireless combined power transmission apparatus of claim 1, wherein the transformer unit includes a flyback DC-DC converter.

11. The wired-wireless combined power transmission apparatus of claim 1, further comprising a filter unit filtering the AC input signal and outputting a filtered AC input signal to the rectifying unit.

12. A wired-wireless combined power transmission method in a wired-wireless combined power transmission apparatus, comprising:
converting an AC input signal into a DC signal;
receiving the DC signal, to transform a size of the DC signal into a predetermined size;
transmitting wirelessly power to a wireless power receiver; and
supplying power to a wired power receiver,
wherein the receiving the DC signal comprises:
receiving the DC signal, by a primary inductor;
receiving the DC signal from the primary inductor, by a first secondary inductor of a secondary inductor electrically connected to the primary inductor;
filtering a first transformed DC signal from the first secondary inductor, by a first output filter;
outputting a first filtered output signal from the first output filter to the wireless power transmission unit;
receiving the DC signal from the primary inductor, by a second secondary inductor of a secondary inductor electrically connected to the primary inductor;
filtering a second transformed DC signal from the second secondary inductor, by a second output filter; and
outputting a second filtered output signal from the second output filter to the wired power receiver.

13. The wired-wireless combined power transmission method of claim 12, wherein the transforming of the size of the DC signal, which has been converted into the DC signal, into the predetermined size comprises:
receiving the DC signal and transforming the DC signal into a plurality of output voltages different from each other; and
filtering the output voltages to be output.

14. The wired-wireless combined power transmission method of claim 12, wherein, in the transmitting wirelessly power to a wireless power receiver, the power is wirelessly transmitted according to electromagnetic induction through a transmission coil.

15. The wired-wireless combined power transmission method of claim 13, wherein, in the transmitting wirelessly power to a wireless power receiver, if a plurality of transmission coils are provided, the power is simultaneously transmitted to a plurality of power receivers wirelessly through the transmission coils.

16. The wired-wireless combined power transmission method of claim 13, wherein the wired-wireless combined power transmission apparatus includes a transmission resonance coil electrically connected to a transmission coil, and, in the transmitting wirelessly power to a wireless power receiver, the power is wirelessly transmitted according to electrical resonance through the resonance coil.

17. The wired-wireless combined power transmission method of claim 12, further comprising removing an electromagnetic interference (EMI) noise by filtering the AC input signal before converting the AC input signal.

* * * * *